No. 814,040. PATENTED MAR. 6, 1906.
J. HARDING.
APPARATUS FOR MAKING CHEESE.
APPLICATION FILED AUG. 8, 1904.

Witnesses
Vincent Hughes

Inventor
James Harding
by
Attorney

UNITED STATES PATENT OFFICE.

JAMES HARDING, OF MAIDEN BRADLEY, NEAR BATH, ENGLAND.

APPARATUS FOR MAKING CHEESE.

No. 814,040.  Specification of Letters Patent.  Patented March 6, 1906.

Application filed August 8, 1904. Serial No. 220,000.

*To all whom it may concern:*

Be it known that I, JAMES HARDING, a subject of the King of Great Britain, residing at Maiden Bradley, near Bath, in the county of Somerset, England, have invented certain new and useful Improvements in Apparatus for Making Cheese, of which the following is a specification.

This invention relates to improvements in apparatus for making cheese, and has for its main object to provide apparatus of this class chiefly intended for the manufacture of Cheddar cheese in which the risk of the milk and resulting curd and whey becoming burnt is eliminated.

Heretofore it has been the practice to heat the contents of the cheese tub or vessel by means of gas or other flames or by the direct application of steam; but this practice had the serious disadvantage of frequently causing the curd to be burnt in places by the dry heat, thereby resulting in considerable waste, while, furthermore, it was difficult to obtain an even heating of the contents of the tub or vessel.

In order that my invention may be the more readily understood and carried into practical effect, reference is hereby made to the accompanying sheet of illustrative drawings, wherein I have illustrated a convenient manner of carrying my said invention into practical effect.

Figure 1:
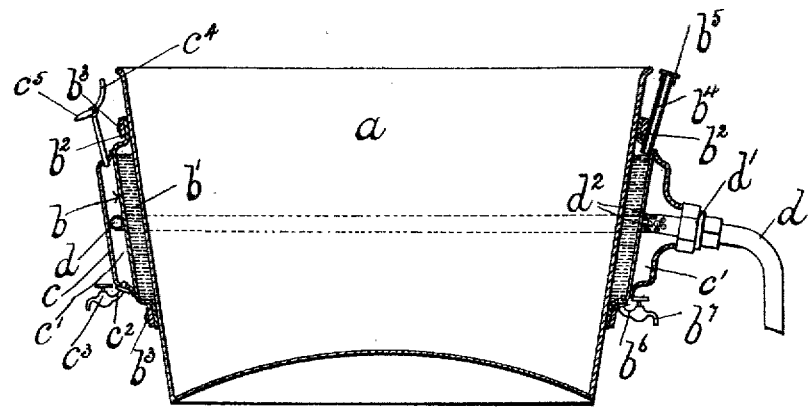
Figure 2:
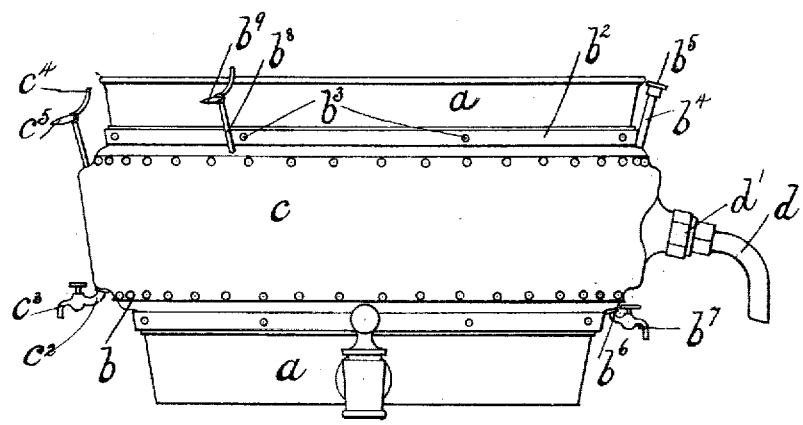

In the drawings referred to, Figure 1 represents a sectional elevation of a cheese tub or vessel, showing the application of my invention thereto, while Fig. 2 is an elevational view thereof.

The reference-letter $a$ represents a tub or vessel which may in the main be of ordinary form, such vessel preferably being constructed of copper, although any other suitable metal or material may be employed in combination with or in lieu thereof.

Surrounding the outside of the tub or vessel $a$ is a jacket $b$ to form an annular water-chamber $b'$, such jacket preferably being connected to the vessel $a$ by means of collars $b^2$ and rivets $b^3$.

A filling-inlet $b^4$ is provided, which inlet is normally closed by a screw-cap $b^5$ or its equivalent, while an outlet $b^6$, controlled by a cock $b^7$, is provided for emptying purposes.

A vent-pipe $b^8$, controlled by a cock $b^9$, is provided in jacket $b$ for the purpose of allowing the air to escape when the water is introduced into the inlet $b^4$.

Arranged upon the outside of the water-jacket $b$ I provide a steam-jacket $c$ to form an annular steam-chamber $c'$, the necessary steam being introduced into such chamber by means of a pipe $d$, communicating with the source of supply. The said steam-pipe $d$ is provided with a suitable union $d'$ at its junction with the jacket $c$, while such pipe is carried around the interior of the steam-jacket to the outer side of the water-jacket $b$, the steam being distributed throughout the said steam-chamber through perforations $d^2$ in that part of the said pipe $d$ which is within the steam-chamber.

An outlet $c^2$, controlled by a cock $c^3$, is provided in the jacket $c$ for the withdrawal of the condensed steam, while a vent-pipe $c^4$, having a suitable valve $c^5$, is provided for allowing the escape of superfluous steam from the steam-chamber.

It will be understood from the foregoing that during the process of cheese-making the curd contained in the tub or vessel $a$ is heated to the required temperature by introducing steam through the pipe $d$ into the steam-chamber $c'$, such steam escaping through the perforations $d^2$, and so circulating evenly throughout the said chamber.

By interposing the water-jacket aforesaid between the steam-chamber and the walls of the tub or vessel $a$ the steam is relieved of its burning heat, and as a consequence curd of a more even consistency and better flavor is obtained.

It is obvious that I may also employ similar water and steam chambers in connection with other dairy utensils where the contents of such utensils are required to be heated.

What I claim, and desire to secure by Letters Patent, is—

In cheese-making apparatus of the kind described, the combination with a metal tub or vessel; of an annular water jacket or chamber surrounding said tub having inlet and outlet openings; an annular steam jacket or chamber surrounding said water-jacket which is interposed between the walls of the said tub and said steam-jacket; and a steam-supply pipe communicating with said steam-jacket and circulating around the interior of same, said pipe being perforated in that part which is inclosed by said steam-jacket, substantially as specified.

JAMES HARDING.

Witnesses:
GERARD MOSELY,
JAMES SMITH.